US010460256B2

(12) United States Patent
Amershi et al.

(10) Patent No.: US 10,460,256 B2
(45) Date of Patent: Oct. 29, 2019

(54) INTERACTIVE PERFORMANCE VISUALIZATION OF MULTI-CLASS CLASSIFIER

(71) Applicant: MICROSOFT TECHNOLOGY LICENSING, LLC, Redmond, WA (US)

(72) Inventors: Saleema A. Amershi, Seattle, WA (US); Bongshin Lee, Issaquah, WA (US); Jina Suh, Seattle, WA (US); Jason Douglas Williams, Seattle, WA (US); Donghao Ren, Seattle, WA (US)

(73) Assignee: Microsot Technology Licensing, LLC, Redmond, VA (US)

( * ) Notice: Subject to any disclaimer, the term of this patent is extended or adjusted under 35 U.S.C. 154(b) by 592 days.

(21) Appl. No.: 15/232,557

(22) Filed: Aug. 9, 2016

(65) Prior Publication Data

US 2018/0046935 A1 Feb. 15, 2018

(51) Int. Cl.
| | | |
|---|---|---|
| *G06F 17/00* | (2019.01) | |
| *G06N 20/00* | (2019.01) | |
| *G06K 9/62* | (2006.01) | |
| *G06N 7/00* | (2006.01) | |
| *G06T 11/00* | (2006.01) | |
| *G06T 11/20* | (2006.01) | |

(52) U.S. Cl.
CPC ............ *G06N 20/00* (2019.01); *G06K 9/628* (2013.01); *G06K 9/6262* (2013.01); *G06N 7/005* (2013.01); *G06T 11/001* (2013.01); *G06T 11/206* (2013.01)

(58) Field of Classification Search
CPC . G06F 16/9027; G06F 16/904; G06K 9/6262; G06N 20/00; G06N 7/005; G06T 11/001; G06T 11/206
See application file for complete search history.

(56) References Cited

U.S. PATENT DOCUMENTS

| | | | | |
|---|---|---|---|---|
| 2008/0183639 A1* | 7/2008 | DiSalvo | ............... | G06Q 40/02 705/36 R |
| 2014/0337816 A1* | 11/2014 | Chiluvuri | ............... | G06F 8/36 717/107 |

OTHER PUBLICATIONS

Asallakh, et al., "Visual Methods for Analyzing Probabilistic Classification Data", In Proceedings of the IEEE Transactions on Visualization and Computer Graphics, vol. 20, Issue 12, Dec. 31, 2014, pp. 1703-1712. (Year: 2014).*

Alsallakh, et al., "Radial Sets: Interactive Visual Analysis of Large Overlapping Sets", In Proceedings of the IEEE Transactions on Visualization and Computer Graphics, vol. 19, Issue 12, Oct. 16, 2013, pp. 2496-2505.

(Continued)

*Primary Examiner* — Robert G Bachner
(74) *Attorney, Agent, or Firm* — Shook, Hardy & Bacon, LPP

(57) ABSTRACT

Methods, computer systems, computer-storage media, and graphical user interfaces are provided for improving performance of a multi-class classifier. An interactive graphical user interface includes an item representation display area that displays a plurality of item representations corresponding to a plurality of items processed by a multi-class classifier. The classifier's performance can be visualized using bidirectional bar graphs displaying true positives, false positives, and false negatives for each class.

20 Claims, 13 Drawing Sheets

(56) References Cited

OTHER PUBLICATIONS

Alsallakh, et al., "Visual Methods for Analyzing Probabilistic Classification Data", In Proceedings of the IEEE Transactions on Visualization and Computer Graphics, vol. 20, Issue 12, Dec. 31, 2014, pp. 1703-1712.

Amershi, et al., "ModelTracker: Redesigning Performance Analysis Tools for Machine Learning", In Proceedings of the 33rd Annual ACM Conference on Human Factors in Computing Systems, Apr. 18, 2015, pp. 337-346.

"International Search Report and Written Opinion Issued in PCT Application No. PCT/US2017/045395", dated Oct. 9, 2017, 14 Pages.

Ren, et al., "Squares: Supporting Interactive Performance Analysis for Multiclass Classifiers", In Proceedings of the IEEE Transactions on Visualization and Computer Graphics, vol. 23, Issue 1, Aug. 10, 2016, 14 Pages.

\* cited by examiner

INTERACTIVE PERFORMANCE VISUALIZATION OF MULTI-CLASS CLASSIFIER

BACKGROUND

Machine-learning technology is an important tool for dealing with large amounts of data. Such technology enables the construction of systems that can learn from a particular data set and, based on that learning, perform accurately on new, unseen data. Machine-learned models include classification models, such as binary classification models and multi-class classification models, entity extraction models, and ranking models. A binary classifier, for example, classifies items of data into one of two classes. A multi-class classifier is similar to a binary classifier, but instead of classifying items of data into one of two classes, the multi-class classifier classifies items of data into one of several classes. To accomplish this, the classifier is provided a set of training data, where each item of training data is labeled, either automatically or manually by a human operator, as belonging to one of the several classes. The classifier learns from this labeled training data, and then, based on its learning, predicts which class items belong to by assigning a score for each class to each item. For each item evaluated, a probability score may be calculated for each available class. The score reflects a probability, as assessed by the classifier, that the item belongs to a particular class. Thus, the score indicates a confidence level associated with the classifier's prediction.

An entity extraction model locates and classifies items of data into predefined categories, such as locating and classifying the names of people in a textual document. A ranking model assigns a score to a set of items of data for the purpose of sorting those items, such as a model used to rank search results in a web page search engine. In order to improve and refine any of these or other machine-learned models, it is important that a user be able to assess how well the machine-learned model is performing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, improving the operation of multi-class classifiers by providing an interactive visualization of performance. The visualization of various performance metrics can help troubleshoot the multi-class classifier by helping practitioners understand where additional or different training can improve performance. In aspects, the technology described herein includes a visual representation that simultaneously represents the classifier's performance at a model level, across all items of data processed for different classes, at a class level, and an item level, for each item of processed data.

The performance can be measured by having a multi-class classifier process labeled data. The label indicates the ground truth for each item. The performance can then be evaluated by comparing the class each test item is assigned to with the class label for each test item. When the assignment matches the label, then a true positive occurs. When the assignment does not match the label, then both a false positive and a false negative occur. The false positive is with respect to the incorrect class that an item is assigned to. The false negative is with respect to the class the item should have been assigned to.

In an exemplary aspect, the technology described shows true positives, false positives, and false negatives across multiple classes through a bidirectional bar graph. Thus, the visualization provides a sense of whether the classifier is generally making accurate predictions about the data as a whole. At the same time, the visualization depicts item-level performance, including whether a prediction made by the classifier regarding a particular item agrees with the predetermined label assigned to the item. In this way, the technology described herein enables a user to quickly identify, prioritize, and inspect different types of errors.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The technology described herein is described in detail below with reference to the attached drawing figures, wherein.

DETAILED DESCRIPTION

Figure 1:
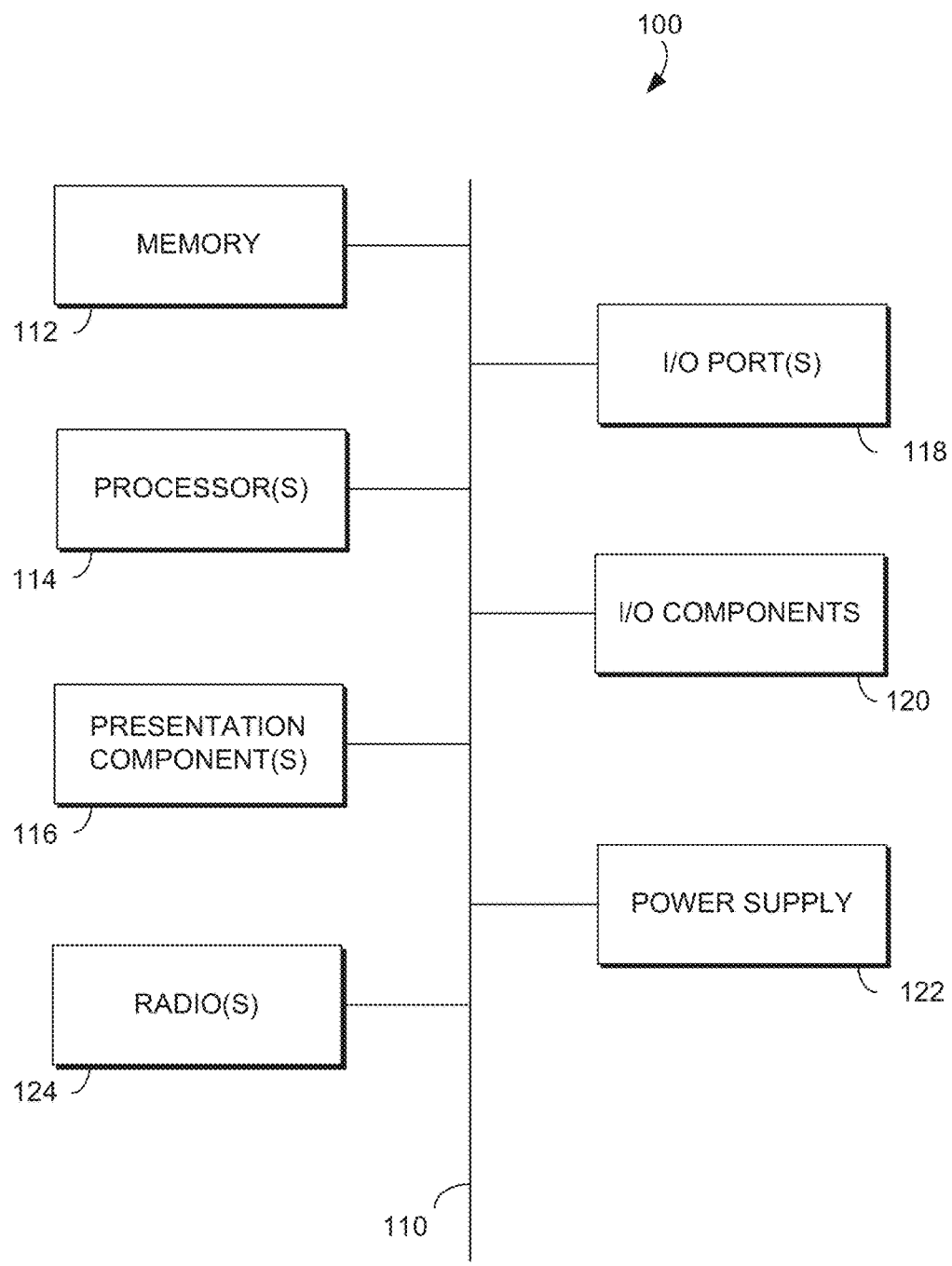
FIG. 1 is a block diagram of an exemplary computing environment suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer storage media for, among other things, improving the operation of multi-class classifiers by providing an interactive visualization of performance. The visualization of various performance metrics can help troubleshoot the multi-class classifier by helping practitioners understand where additional or different training can improve performance. In aspects, the technology described herein includes a visual representation that simultaneously represents the classifier's performance at a model level, across all items of data processed for different classes, at a class level, and an item level, for each item of processed data.

The performance can be measured by having a multi-class classifier process labeled test items. The label indicates the ground truth for each item. The performance can then be evaluated by comparing the class each test item is assigned to. When the class assignment matches the class label, then a true positive occurs. When the class assignment does not match the class label, then both a false positive and a false negative occur. The false positive is with respect to the incorrect class that an item is assigned to. The false negative is with respect to the class the item should have been assigned to.

In an exemplary aspect, the technology described shows true positives, false positives, and false negatives across multiple classes through a bidirectional bar graph. Thus, the visualization provides a sense of whether the classifier is generally making accurate predictions about the data as a whole. At the same time, the visualization depicts item-level performance, including whether a prediction made by the classifier regarding a particular item agrees with the predetermined label assigned to the item. In this way, the technology described herein enables a user to quickly identify, prioritize, and inspect different types of errors.

Additionally, because aspects of the technology described herein provide graphical user interfaces (GUIs) that have consistent arrangements and orientations, a user can view the GUI and quickly identify certain patterns and understand whether the classifier is performing well. In other words, in instances of the technology described herein, a "good" performance is visually represented in a consistent way, and similarly, certain errors are visually represented in a consistent way. Thus, the user does not need to spend time orienting himself with respect to the GUI each time model performance is displayed. This is in contrast to scatterplots and other means of visualizing model performance, which do not display the performance for a multi-class classifier in a consistent way.

The visualizations of model performance provided by the technology described herein can be interactive in nature. Thus, a user may interact with the visualization by selecting an individual item representation to view details regarding the corresponding item. The user may also select an item representation or item group representation to reveal relationships among multiple items.

Aspects of the technology described herein can help practitioners optimize multi-class classifiers. The technology described herein can identify true positives, false positives, and false negatives for each item of test data analyzed by a classifier. In addition to simply identifying an amount of false positives, false negatives, and true positives that occur for an individual class, the technology also identifies which class the false negatives were classified into and which class each false positive should have been classified into.

In one aspect, true positives, false positives, and false negatives for an individual class are depicted on a bidirectional bar graph. In one aspect, an individual bidirectional bar graph for an individual class can portray true positives and false positives on one side of the graph and false negatives on the other side of the graph. The false positives, false negatives, and true positives can be divided into confidence score ranges. For example, the confidence scores assigned by the multi-class classifier could be split into 10 different ranges, 8 different ranges, 6 different ranges, 5 different ranges, 4 different ranges, or such. Then true positives, for example, can be grouped into a bar that represents an amount of true positives for the class that falls into a corresponding confidence score range.

In one aspect, bidirectional bar graphs are concurrently displayed for each class available in a multi-class classifier. Each class can be assigned a distinct color. The true positives are portrayed in the color assigned with the class. Similarly, the false positives can be displayed in a color associated with the class into which the item should have been classified based on a label for the item found in the test data. Additionally, the false negatives, which should have been assigned to the class, are instead portrayed in the color of the class into which they were actually assigned. In one aspect, true positives are portrayed as a solid color, false positives as a hatch color, and false negatives assigned a colored box that is clear in the middle. Other ways of differentiating true positives, false positives, and false negatives in a way that is visibly distinct are possible.

In one aspect, each bar graph is shown with a spark line above it. A spark line is a small line chart that can be drawn without axes or coordinates. The spark line presents the general shape of the variation in confidence scores for a single item or group of items across different classes. In addition, a table of raw data can be shown concurrently with the bidirectional bar graphs. The raw data could be shown in forms other than a table. By selecting a portion of a bidirectional bar graph, data associated with the data depicted in the selected portion of the bar graph can be shown in the concurrently displayed table.

Having briefly described an overview of aspects of the technology described herein, an exemplary operating environment in which aspects of the technology described herein may be implemented is described below in order to provide a general context for various aspects of the technology described herein.

Referring to the drawings in general, and initially to FIG. 1 in particular, an exemplary operating environment for implementing aspects of the technology described herein is shown and designated generally as computing device 100. Computing device 100 is just one example of a suitable computing environment and is not intended to suggest any limitation as to the scope of use or functionality of the technology described herein. Neither should the computing device 100 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O port(s) 118 allow computing device 100 to be logically coupled to other devices including I/O components 120, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include radio(s) 124. The radio 124 transmits and receives radio communications. The computing device may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Figure 2:
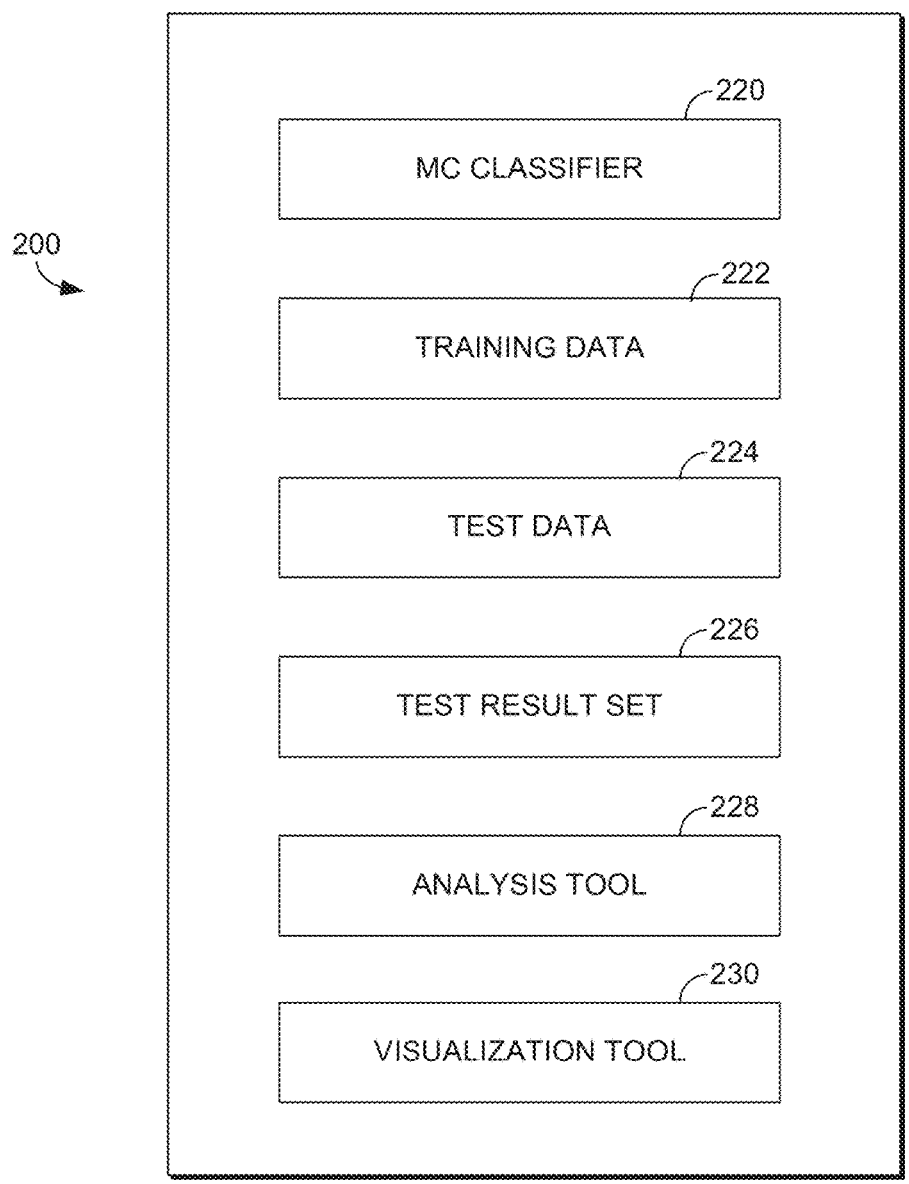
FIG. 2 is a block diagram of an exemplary system for visually representing a performance of a multi-class classifier, suitable for use in implementing aspects of the technology described herein.

Referring now to FIG. 2, a block diagram is provided illustrating an exemplary system 200 in which aspects of the technology described herein may be employed. Generally, the system 200 illustrates an environment suitable for generating an interactive GUI that, among other things, displays performance for a multi-class classifier. As mentioned, the "items" referenced herein include any item of data that is processed by a multi-class classifier. An item may include, for example, text, images, video, audio, characters, words, documents, combinations of documents, web pages, or any other item of data. Furthermore, an "item" may actually include a combination of items or group of items.

Among other components and modules not shown, the system 200 generally includes a multi-class classifier 220, a training data store 222, a test data store 224, a test result set store 226, an analysis tool 228, and a visualization tool 230. In some aspects, one or more of the illustrated components and modules may be implemented as stand-alone applications. In other aspects, one or more of the illustrated components and modules may be implemented via a client computing device, as an Internet-based service, or via another arrangement. Any number of components and modules may be employed to achieve the desired functionality within the scope of aspects hereof. Further, components and modules may be located on any number of computing devices. By way of example only, the computing environment 200 might be provided as a single server, a cluster of servers, or a computing device remote from one or more of the remaining components.

The multi-class classifier 220 is a machine-learned model that classifies an item into one of at least three available classes. The multi-class classifier 220 can output calibrated probability scores that an individual item fits into each available class. The multi-class classifier can be built using decision trees, naive Bayes classifiers, random forests, and many other algorithms. In addition, multi-class classifiers can also be built by training binary classifiers and then combining their outputs to make predictions on individual instances. For example, the one-vs-rest method (also known as one-vs-all) trains N binary classifiers for an N-class problem such that each binary classifier discriminates one of the target classes from the rest of the classes. The classifier that produces the highest one-vs-rest score then determines the prediction class for each instance. With the one-vs-one (or all-vs-all) method, binary classifiers are trained on every pair of classes and majority voting is used to select the winning class prediction on each instance. The technology described herein can support analysis of these and any multi-class classifier that can produce scores on at least the winning class.

The training data store 222 comprises data that is used to train the multi-class classifier 220. The training data comprises items (or instances of data) along with labels assigning the data to a class. The training data store 222 can comprise training data for different classification scenarios. For example, in a first scenario a classifier may be trained to recognize handwritten numbers and in a second scenario a classifier may be trained to recognize audio sounds. Within a single scenario, training data sets can be specialized to help improve performance in certain areas, such as differentiating between a handwritten 3 and a handwritten 5. The training data can be used to initialize a multi-class classifier or to retrain or optimize a classifier. It should be noted that in some aspects, the training data can be used as test data.

The test data store 224 stores one or more test data sets. The test data sets include classifiable items and corresponding labels indicating to which class the item belongs. For example, the item could be a handwritten 2 with a label indicating the item depicts a 2. The labels represent a ground truth for the item. The labels can be generated by a person that visually inspects the item and then classifies the item into an available class. The test data can take a similar form as the training data.

The test result set store 226 stores results of different test instances. For example, a first set of test results could be generated at a first point in time and stored in the test results store. After analysis of the test results, optimization of the multi-class classifier could occur by retraining in a way targeted to reduce errors identified through the analysis. A second set of test results could then be generated by running test data, possibly the same test data, through the retrained multi-class classifier. The first test result set could then be compared with the second test result set to see if the updated training had the desired effect.

The analysis tool 228 analyzes test result sets to measure performance that can be displayed. The performance can include determining an amount of true positives, false positives, and false negatives for each class the classifier is capable of assigning items to. The true positives, false positives, and false negatives can be identified by comparing the class assignments made by the multi-class classifier with labels associated with the items in the test data.

Many performance metrics in multi-class classification are derived from different categories of prediction counts. For example, accuracy is computed as the number of correct predictions over the total number of predictions (correct and incorrect). Other metrics are derived from different types of correct (true positive and true negative) and incorrect (false positive and false negative) predictions. A true negative for class X is an instance predicted as a different class and labeled as a different class. A true positive for class X is an instance predicted as class X and labeled as class X. A false positive for class X is an instance predicted as class X but labeled as another, whereas a false negative for class X is an instance labeled as class X but predicted as another. For example, precision is computed as the number of true positives over the number of true and false positives while recall is the number of true positives over the number of true positives and false negatives. In order to support a wide variety of classification problems, the technology described herein makes both correct and incorrect predictions comparably salient, and makes both false positive and false negative errors comparably salient by using position and color- and pattern-coding of the boxes.

The analysis tool 228 can count the amount of items designated as true positives, false positives, and false negatives for each class as well as for overall performance across classes. The amount of items falling into each category can further be broken down into the amount of items falling into particular confidence score ranges, as explained subsequently.

The visualization tool 230 receives the performance data from the analysis tool 228 and generates a visualization, such as those described subsequently with reference to FIGS. 3-10. Visualization tool 230 or other components can be implemented as an HTML5 widget in JavaScript with jQuery and D3 so that it can be embedded into both Web and desktop applications. Users embedding the technology can handle instance selection events and connect the visualizations to other views (e.g., the visualization can potentially be connected to a Multidimensional scaling (MDS) plot of selected attribute values). The states of the visualization can be saved into a JSON document and loaded back.

The technology can be implemented using a data-flow model to manage intermediate computation results (numerical performance metrics) and visualization states (selection, bookmarks, and view parameters). Once the visualization states or the data set get updated, the data-flow model figures out which parts of the visualization need to be updated and can perform necessary updates.

Different classification problems require optimizing for different performance metrics. For example, in diagnosing diseases, a false positive diagnosis can result in unnecessary and possibly harmful treatment, whereas a false negative may result in a lack of treatment and potential worsening of the disease. The decision of what to optimize for is scenario dependent and based on the relative costs assigned to possible outcomes. In order to support a wide range of scenarios, the visualization should attempt to be agnostic towards any specific metric. For example, false positives can be comparably salient to false negatives to support scenarios where either could be more costly.

The technology represents each class in a color-coded column (e.g., bidirectional bar graph). Each column can contain a vertical axis annotated below by the corresponding class name and optional summary statistics (e.g., true/false positive/negatives and precision/recall) for that class. Boxes positioned on the right side of an axis line represent instances predicted as that axis's corresponding class. Boxes on the left side of any axis line represent instances labeled as that axis's corresponding class (column) but predicted incorrectly as a different class. Boxes on the left therefore denote false negative instances and can have no fill color, but are outlined with the color of the class being predicted. Conversely, the false negatives could be displayed on the right and the false positives on the left side. In another aspect, the true positives are displayed on the right side and both the false positives and the false negatives are displayed on the left side. The right/left orientation described above is just one example. In one aspect, the positives and negatives are reversed. It is also possible to arrange the results in a vertical bidirectional bar graph with results shown above or below a line. Accordingly, the terms "first side" and "second side" are used throughout to describe most of the bidirectional bar graphs. It is to be understood that the first side and second side are adaptable to both a vertical or horizontal orientation of the bidirectional bar graph.

The technology described herein can be used to visually estimate several common count-based overall and class-level performance metrics. For example, classifier accuracy (the number of correctly predicted instances over all instances) is estimated by the number of solid boxes out of the total number of boxes on the right side of the axes lines. Similarly, class-level precision (true positives over all positively predicted instances) is visually estimated by the number of solid boxes out of the solid plus striped boxes (FIG. 5), while recall (true positives over all positively labeled instances) is visually estimated by the number of solid boxes out of the solid plus outlined boxes.

Some performance metrics take into consideration prediction scores on instances (i.e., items). For example, logarithmic loss penalizes predictions that deviate far from their true label. In order to support estimation of metrics that also consider confidence score (alternatively described herein as prediction scores), boxes on either side of any axis are positioned along the vertical dimension according to their prediction scores, with high scores to the top and low scores to the bottom (FIGS. 3-5 and 7-10). In this way, striped or outlined boxes towards the top of a column should be penalized more than striped or outlined boxes towards the bottom. Similarly, solid boxes towards the bottom of a column should be penalized more than solid boxes towards the top.

Figure 3:
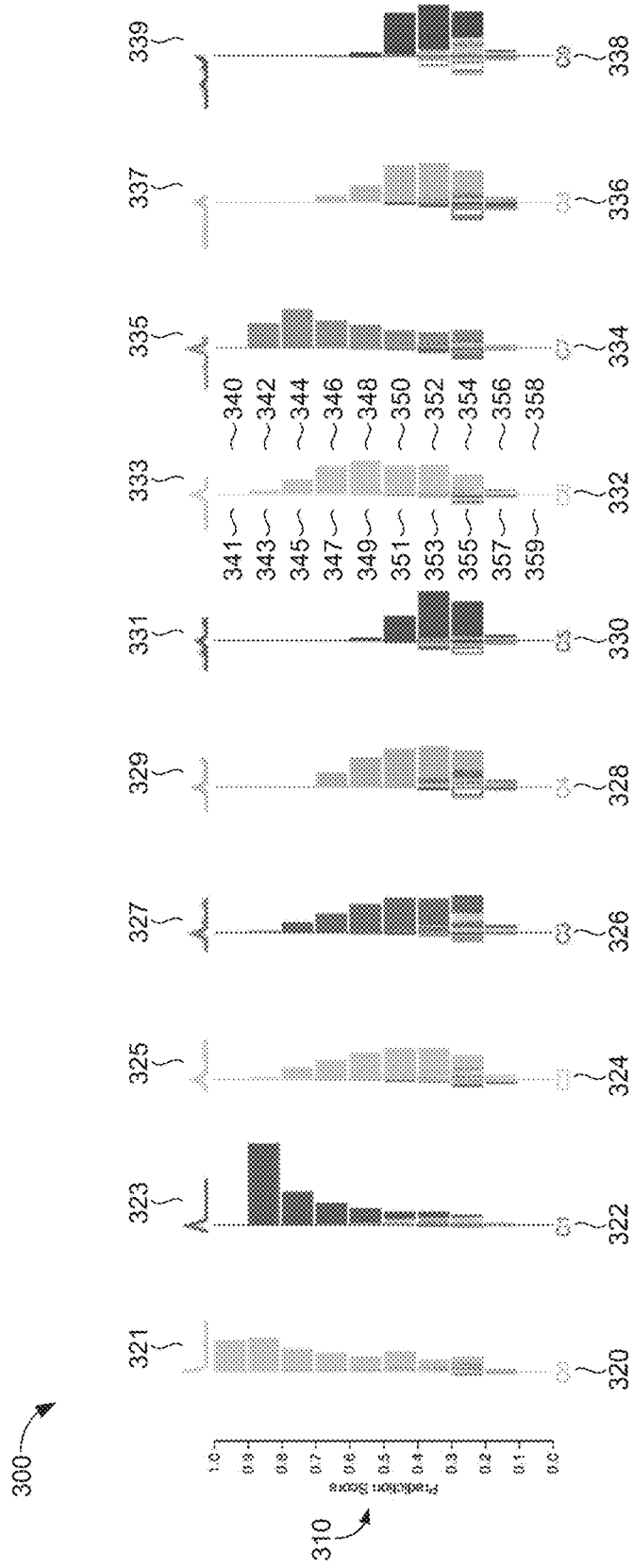
FIG. 3 is an exemplary graphical user interface for providing an interactive visualization of performance for a first multi-class classifier in accordance with aspects of the technology described herein.
Figure 4:
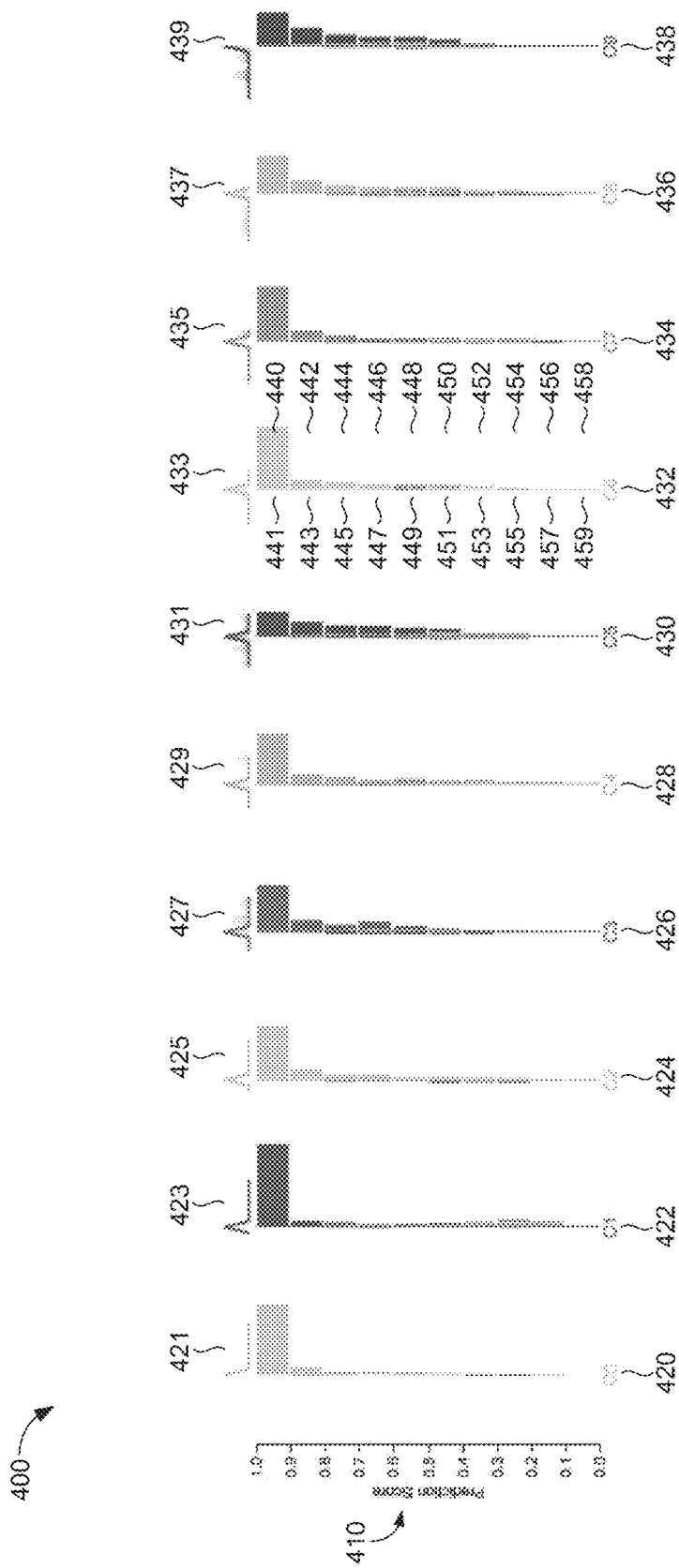
FIG. 4 is an exemplary graphical user interface for providing an interactive visualization of performance for a second multi-class classifier in accordance with aspects of the technology described herein.

Displaying scores not only supports estimating score-based performance metrics, it allows for prioritizing efforts by prediction confidence or error severity. This is in contrast to count-based metrics and confusion matrices that treat all errors equally (and all correct predictions equally). For example, two classifiers with very similar accuracy may have very different score distributions (FIGS. 3 and 4). With the technology described herein, distributions are directly visible and allow practitioners to decide, for example, to debug classifiers or classes with more severe errors first.

Distributing boxes vertically (or horizontally (not shown) if a vertical orientation of the graph is used) by prediction score provides item (i.e., instance) level performance. Some multi-class classifiers, however, may also produce scores for an instance across all classes (in these cases, the class that produces the highest score, the winning class, is selected as the predicted class). Although most common performance metrics and confusion matrices ignore these scores, they can reveal important insights into classifier performance. For example, an instance correctly predicted as one class with a score of 0.5 may also have a score on another class of 0.49. Although this instance would not technically be in error, the classifier may still be considered confused because slight variations or noise may easily flip the prediction from correct to incorrect (ideally, correct predictions will have high scores for the correct class and low scores for all others).

The technology described herein can reveal scores for an instance across all classes on demand when a user hovers or clicks on a box in the display. Scores are displayed using parallel coordinates, with a polyline intersecting each axis at the corresponding score level for that class (see the polylines in FIG. 5 corresponding to box in the class C5 column). Note that the polyline intersection may not align exactly with the vertical position of the corresponding box because the line intersects at the exact score location while boxes are binned along the score axis.

Figure 5:
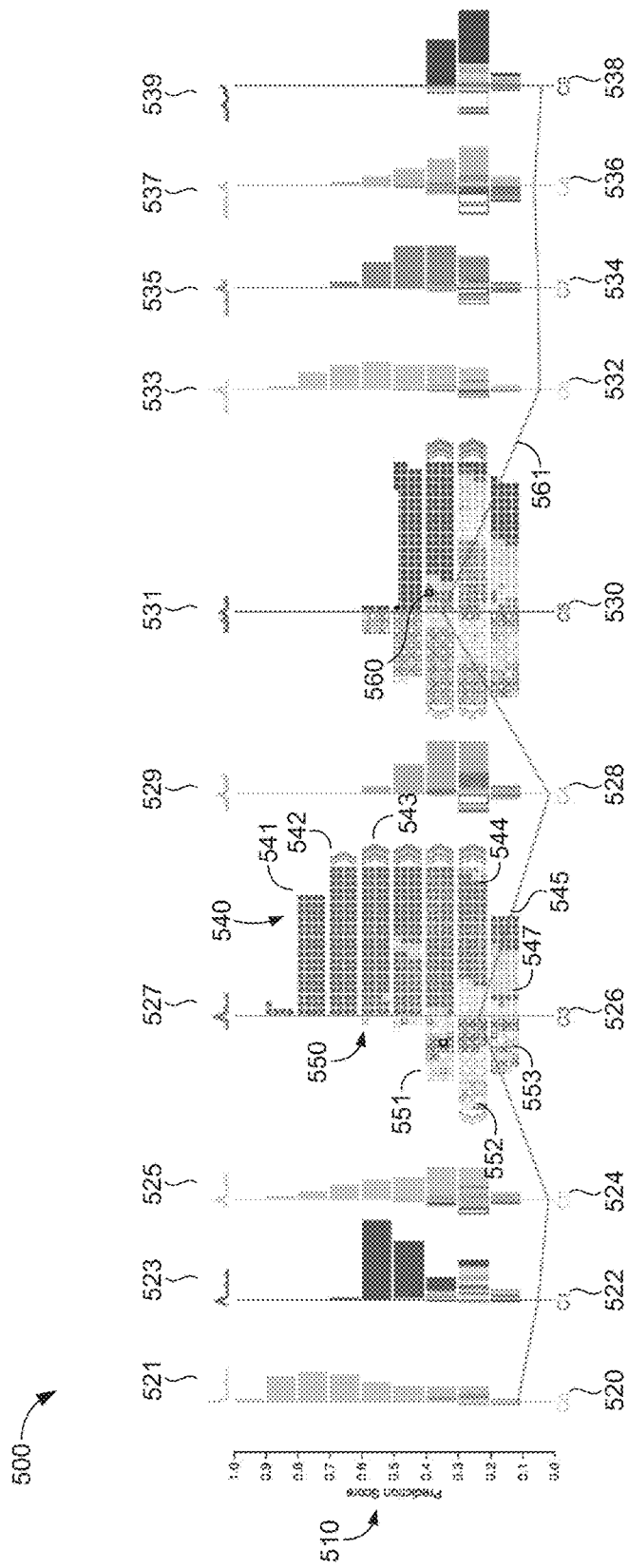
FIG. 5 is an exemplary graphical user interface for providing an interactive visualization of performance for a multi-class classifier, wherein a detailed view of an item representation display area is provided, in accordance with aspects of the technology described herein.
Figure 6:
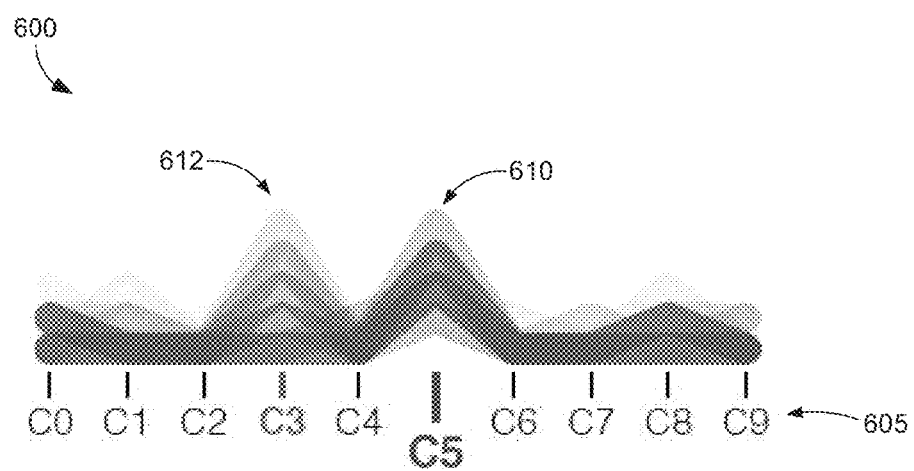
FIG. 6 is an exemplary graphical user interface for providing an interactive visualization of performance for a multi-class classifier showing a detailed view of a spark graph for a specific class, in accordance with aspects of the technology described herein.

Instance scores across all classes also reveal between-classes confusion not visible in confusion matrices that only display confusions about winning class predictions. Between-class confusion is indicated when parallel coordinates for instances have high peaks in multiple classes (i.e., have high prediction scores on multiple classes). The technology described herein summarizes confusion information via a spark line chart above each axis displaying the parallel coordinates of all instances labeled as the corresponding class (FIGS. 5 and 6). The spark lines are aligned so that each class axis points to the same axis in the corresponding spark line. In this way, a class with little confusion with other classes will have a single peak above the axis. For example, the spark line in class C5's column in FIG. 6 has multiple peaks. The two strongest peaks correspond to class C3 and C5, which indicates that there is confusion between C3 and C5. The valley on C4 indicates that there is less confusion between class C5 and C4.

Turning now to FIG. 3, a multi-class performance visualization 300 is shown, in accordance with an aspect of the technology described herein. The visualization 300 shows performance for ten different classes. Aspects of the technology described herein are not limited to use with a ten-class multi-class classifier. In the example shown in FIG. 3 and subsequent examples, a multi-class classifier is trained to classify handwritten numerals into 0, 1, 2, 3, 4, 5, 6, 7, 8, or 9. Each available numeral represents a class.

Each bidirectional bar graph represents the performance associated with an individual class. For example, the class 0 bidirectional bar graph 320 shows the classifier's performance when categorizing items as a "0." The class 1 bidirectional bar graph 322 shows the classifier's performance classifying items as the numeral 1. The class 2 bidirectional bar graph 324 shows the classifier's performance classifying items as the numeral 2. The class 3 bidirectional bar graph 326 shows the classifier's performance classifying items as the numeral 3. The class 4 bidirectional graph 328 shows the classifier's performance classifying items into the numeral 4. The class 5 bidirectional bar graph 330 shows the classifier's performance classifying items as the numeral 5. The class 6 bidirectional bar graph 332 shows the classifier's performance classifying items as the numeral 6. The class 7 bidirectional bar graph 334 shows the classifier's performance classifying items as the numeral 7. The class 8 bidirectional bar graph 336 shows the classifier's performance classifying items as the numeral 8. The class 9 bidirectional bar graph 338 shows the classifier's performance classifying items as the numeral 9.

Each class is associated with a color. Accordingly, class 0 is assigned light blue. Class 1 is assigned dark blue. Class 2 is assigned light green. Class 3 is assigned dark green. Class 4 is assigned pink. Class 5 is assigned red. Class 6 is assigned light orange. Class 7 is assigned dark orange. Class 8 is assigned light purple. Class 9 is assigned dark purple.

Each class is also associated with a spark line. The spark lines include the class 0 spark line 321, the class 1 spark line 323, the class 2 spark line 325, the class 3 spark line 327, the class 4 spark line 329, the class 5 spark line 331, the class 6 spark line 333, the class 7 spark line 335, the class 8 spark line 337, and the class 9 spark line 339. In brief, the spark lines show the confidence score assigned to test items that are labeled for a class. So the class 6 spark line 333 shows the confidence score the classifier assigned to each class for items labeled as class 6. Spark lines will be explained in more detail with reference to FIG. 6.

As can be seen, the visualization 300 includes a confidence score scale 310. In this example, the confidence score can range from 0 to 1. The scale has been broken into tenths. Aspects of the technology are not limited to breaking the range into tenths. As can be seen, the amount of test items given a score falling into each range is then shown on the bidirectional bar graphs.

Taking only the class 6 bar graph 332 as an example, ten slots are shown on the right side of the scale and ten on the left side of the scale. In one aspect, true positives are shown on the right side of the scale in the same color associated with the graph's class. For example, the true positives associated with the class 6 are shown on the right hand side in light orange.

Not every confidence score range will include data. For example, the 0.9 to 1 range 340 on the right side of the scale does not include any data, and the 0 to 0.1 range on the right side 358 also does not include any data. The 0.8 to 0.9 range 342, the 0.7 to 0.8 range 344, the 0.6 to 0.7 range 346, the 0.5 to 0.6 range 348, the 0.4 to 0.5 range 350, the 0.3 to 0.4 range 352, the 0.2 to 0.3 range 354, and the 0.1 to 0.2 range 356 all include data showing true positives in the light orange color. In addition, the 0.3 to 0.4 range 352, the 0.2 to 0.3 range 354, and the 0.1 to 0.2 range 356 show false positives. These are depicted as hashed and in a color associated with the class into which each item or group of items should have been classified. For example, an item of test data that is labeled as a 4 should be classified as a 4. But if it is classified as a 6 (a false positive 6), then it will be depicted on the right side of the class 6 bidirectional graph 332 in the light pink color associated with class 4. Again, the light pink color and hash indicate a false positive.

The left hand side of the class 6 bidirectional graph 332 shows false negatives. False negatives represent test items that were labeled as a 6, but were instead identified by the classifier as a different number, such as an 8. These false negatives are depicted in the color into which the item was actually classified even though it should have been classified as a 6. The amount of individual items misclassified is depicted on the left hand side in a slot associated with the confidence score assigned by the classifier to a misclassified item. The confidence score used to classify the item is the confidence score the classifier assigned to class 6. Because it was not ultimately assigned to class 6, a higher confidence score was assigned to a different class.

The available slots on the left hand side of the class 6 bidirectional graph 332 include the 0.9 to 1 slot 341, the 0.8 to 0.9 slot 343, 0.7 to 0.8 slot 345, the 0.6 to 0.7 slot 347, the 0.5 to 0.6 slot 349, the 0.4 to 0.5 slot 351, the 0.3 to 0.4 slot 353, the 0.2 to 0.3 slot 355, the 0.1 to 0.2 slot 357, and the 0 to 0.1 slot 359. Only the class 6 bidirectional graph 332 is explained in detail with reference to FIG. 3, but the data shown on the other bidirectional graphs is arranged in a similar fashion and has a similar meaning, but with respect to the class depicted on the respective graph.

Turning now to FIG. 4, the effectiveness of the bidirectional bar graphs in visibly differentiating the performance of different classifiers is illustrated in contrast with results depicted in FIG. 3. As with FIG. 3, FIG. 4 shows a performance visualization 400 for a multi-class classifier. The performance shown in FIG. 4 is for a different classifier than was shown in FIG. 3. For example, a model trained differently or a different type of classifier. Again, the model is for classifying a handwritten numeral into a number between 0 and 9. Each class is associated with the same color as described previously in FIG. 3 and the performance for each class is shown on a bidirectional bar graph.

The bidirectional bar graphs include a class 0 bidirectional bar graph 420, a class 1 bidirectional bar graph 422, a class 2 bidirectional bar graph 424, a class 3 bidirectional bar graph 426, a class 4 bidirectional bar graph 428, a class 5 bidirectional bar graph 430, a class 6 bidirectional bar graph 432, a class 7 bidirectional bar graph 434, a class 8 bidirectional bar graph 436, and a class 9 bidirectional bar graph 438. Each bar graph is associated with a spark line, including spark lines 421, 423, 425, 427, 429, 431, 433, 435, 437, and 439. Similarly, a scale 410 is shown to the far left.

In contrast to the performance illustrated in FIG. 3, for most classes, a very high confidence score is commonly assigned to test items as can be seen by the large bars in the 0.9 to 1 range. Even though the overall performance, as measured by identifying true positives, is similar, the confidence scores are very different.

As with FIG. 3, the right hand side of the bidirectional bar graph shows false positives and true positives, while the left hand side shows false negatives. With reference to the class 6 bidirectional graph 432, the slots for false negatives include the slot 441, the slot 443, the slot 445, the slot 447, the slot 449, the slot 451, the slot 453, the slot 455, the slot 457, and the slot 459. The slots on the right hand side include the slot 440, the slot 442, the slot 444, the slot 446, the slot 448, the slot 450, the slot 452, the slot 454, the slot 456, and the slot 458. The slots on the right hand side show a combination of true positives and false positives.

Turning now to FIG. 5, a more granular view of performance for two classes is illustrated in a performance visualization 500 for a multi-class classifier. As with the previous illustrations shown in FIGS. 3 and 4, the performance of ten different classes is shown. Each class is associated with classifying a handwritten numeral into either 0, 1, 2, 3, 4, 5, 6, 7, 8, or 9. The performance of each class is shown in a bidirectional bar graph. The bidirectional bar graphs include graphs 520, 522, 524, 526, 528, 530, 532, 534, 536, and 538. As before, each bidirectional bar graph is associated with a spark line. The spark lines shown include the spark line 521, the spark line 523, the spark line 525, the spark line 527, the spark line 529, the spark line 531, the spark line 533, the spark line 535, the spark line 537, and the spark line 539. The visualization 500 includes a confidence score scale 510.

Both the class 3 bidirectional bar graph 526 and the class 5 bidirectional bar graph 530 are shown at a lower granularity level than the other graphs. In one aspect, the granularity level of individual graphs can be changed by selecting the graph or by selecting an interface control responsible for granularity. At this level of granularity, each classifiable item within the test data is shown as an individual square. For example, individual square 541 is dark green, which is the color associated with the class 3. In contrast, individual square 544 is a hashed red, which is the color associated with class 5. In this case, the individual item represented by the square 544 was labeled as a 5 in the test data, but was classified as a 3, resulting in a false positive for class 3. This particular item will also be displayed as a false negative on the class 5 bidirectional bar graph 530. The individual square 545 is a dark green indicating a true positive and the square 547 is a hashed dark red indicating a false positive that should have been a class 5.

At the lowest level of granularity, more squares may be present within a range than are easily shown within the space allocated to the interface. Arrows, or other truncation indicators, can be used to indicate additional squares are available for display by selecting the arrows. The single arrow 542 indicates that less squares are available than the triple arrows 543.

The left side of the bidirectional bar graph 526 shows false negatives. The square 550 is a light orange square indicating that an item that should have been labeled as a class 6 object was instead labeled as a class 5 object. The light green square 551 indicates that an item that should have been classified as class 3 was instead classified as class 2. The dark orange square 552 indicates that a square that should have been classified as class 3 was instead classified as class 7. Similarly, the light purple square 553 indicates that an item that should have been classified as class 3 was classified as class 8.

In one aspect, a line chart is shown for an individually selected square. For example, upon selecting square 560, the line graph 561 appears. The line graph intersects an individual bidirectional bar graph's dividing line at the confidence score assigned by the classifier to that item for each class. In this example, it can be seen that the highest confidence score for the 560 square was assigned to the class 5 while the second highest was assigned to the class 3. This can indicate that the individual handwritten numeral resembles both a 5 and a 3. In this case, it was incorrectly predicted as a 5 because the highest confidence score was assigned to the class 5.

Turning now to FIG. 6, a spark line 600 is shown. The spark line 600 can be shown over a bidirectional bar graph associated with class 5. That the spark line 600 is associated with class 5 is shown by the bolded C5 on the scale 605 shown below the spark line. In one aspect, a spark line is shown without a scale. The spark line shows an average confidence score assigned to items labeled for class 5 in the test data. As mentioned, an individual item can be assigned a confidence score in multiple classes and ultimately assigned to the class with the highest assigned score. As can be seen, a first peak 610 appears over the class 5 label and a second peak 612 over the class 3 label. The first peak 610 is to be expected and reflects true positives. The second peak 612 indicates that the classifier currently confuses threes and fives to some extent, resulting in a relatively large number of false positives that should have been assigned to class 5. As can be seen, some confusion also exists with class 8. Though not shown, the Y-axis indicates a confidence score assigned to the item. The higher the peak or greater distance from the X-axis, the higher the corresponding confidence score.

Figure 7:
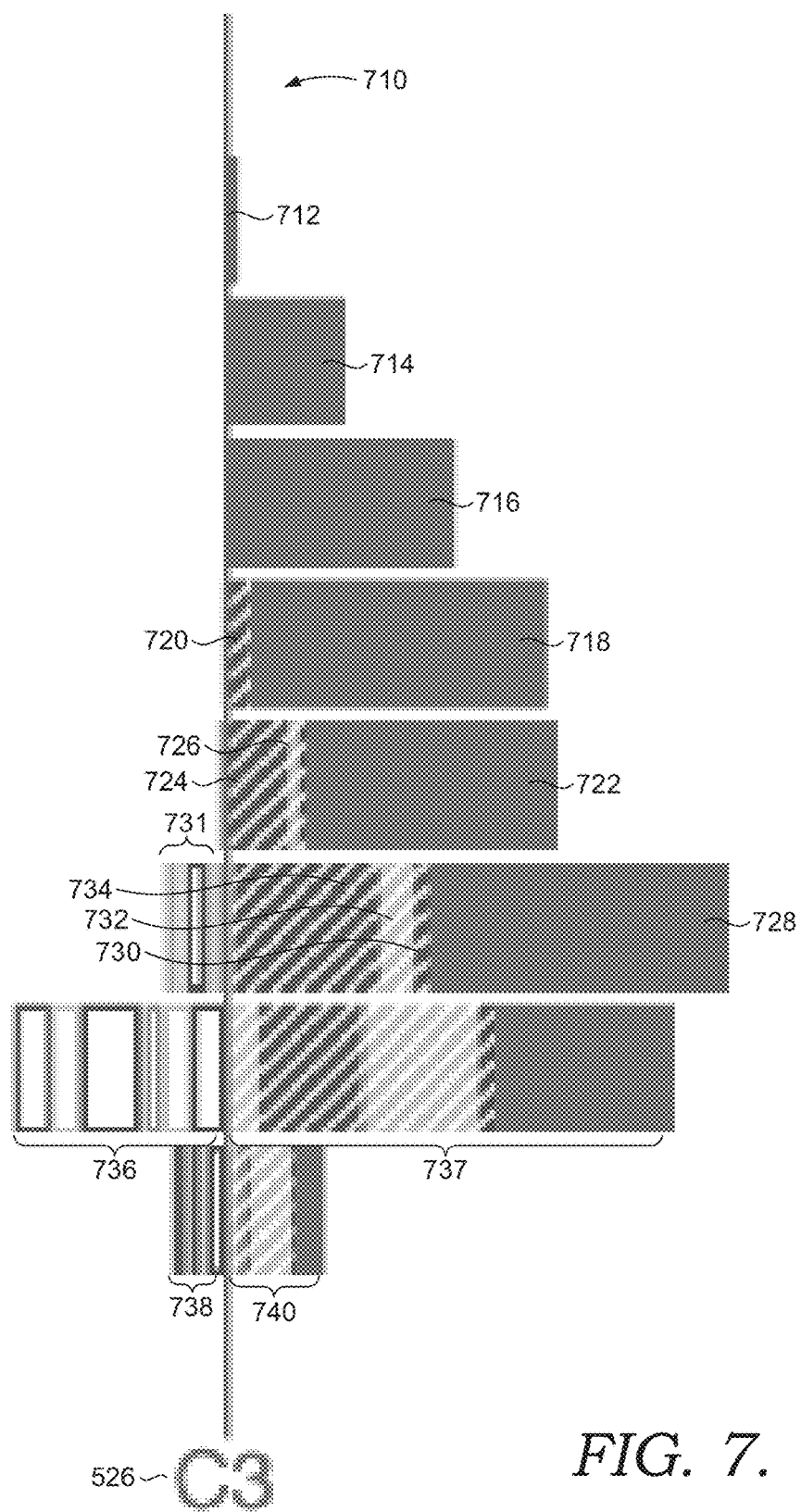
FIG. 7 is an exemplary graphical user interface for providing an interactive visualization of performance for a multi-class classifier showing a bidirectional bar graph for a specific class, in accordance with aspects of the technology described herein.

Turning now to FIG. 7, a detailed view of the class 3 individual bidirectional bar graph 526 is shown. As mentioned, the bar graphs can be shown at different levels of granularity or detail. At the highest level of granularity, the amount of items falling into an individual category is represented as a single bar. For example, in the true positives category, bars 712, 714, 716, 718, 722, and 728 are all shown as dark green indicating that they represent an amount of true positives.

The various hashed bars in the different slots indicate false positives. The red hashed bar 720 represents an amount of false positives that have a class 5 label, but were instead assigned to the class 3. The red hashed bars 724 and 734 indicate additional false positives from class 5 at a different level of confidence. The light purple hashed bars 732 indicate false positives from class 8 and the dark purple hashed bars 730 indicate false positives from class 9. The series of different colored bars 737 and series of different colored bars 740 indicate true positives and false positives at the respective confidence levels. Notice that the upper slot 710 for confidence scores between 0.9 and 1 is empty.

The left side of the class 3 bidirectional bar graph 526 shows false negatives. False negatives with respect to the class 3 are items labeled as 3 within the test data but classified by the classifier into a different class. As can be seen, the amount of false negatives is reflected by an outlined bar with a perimeter having the color of the class into which the item was falsely classified. The light purple bar 726 represents a false positive into the class 8. The series of bars 731, 736, and 738 similarly represent false negatives into different classes. The larger the bar extends along the X-axis, the greater the amount of items that were classified into the corresponding group. The group is formed by the confidence score falling into a range along with the status as a true positive, false positive by class, or false negative by class.

Figure 8:
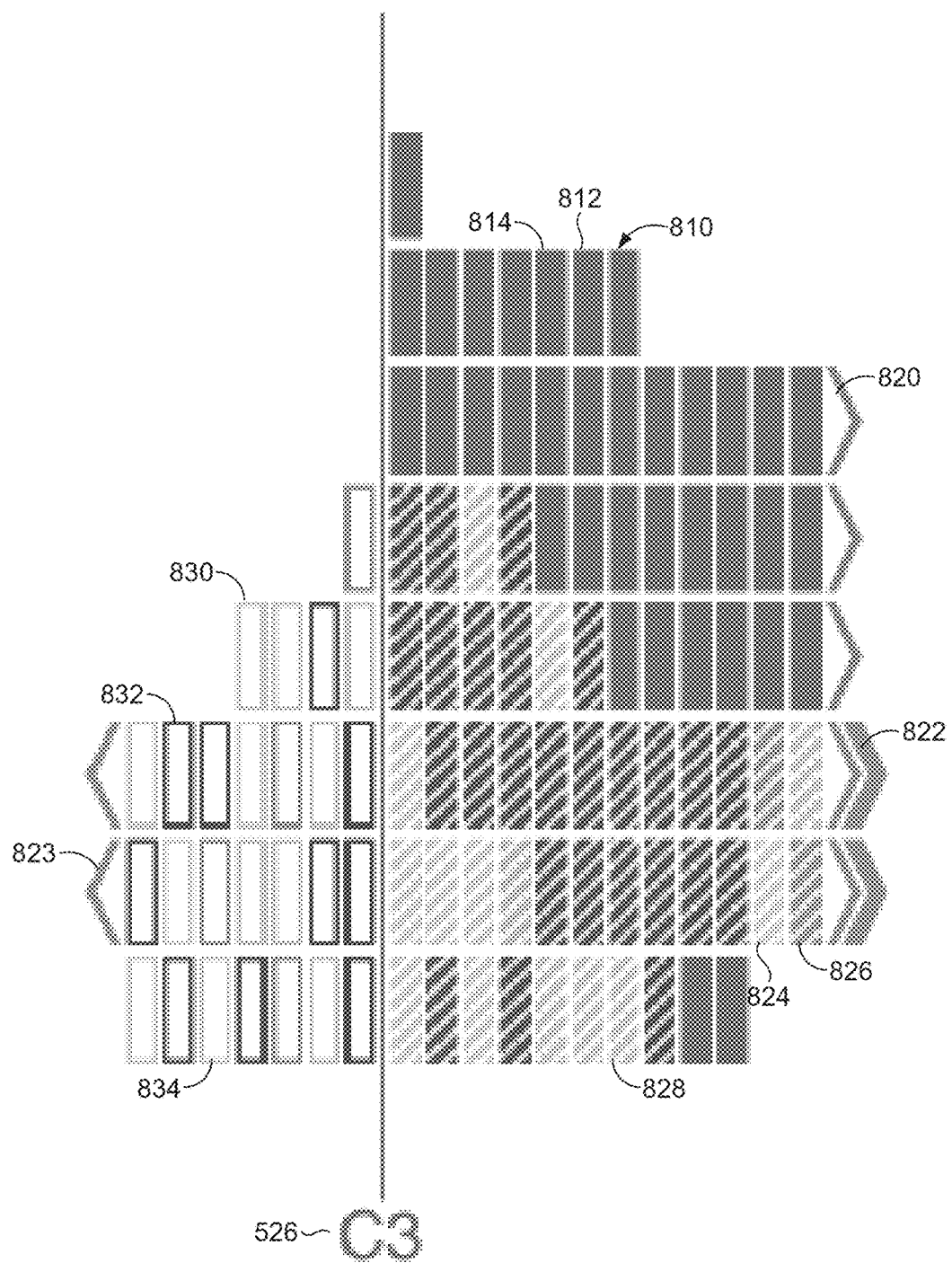
FIG. 8 is an exemplary graphical user interface for providing an interactive visualization of performance for a multi-class classifier showing a bidirectional bar graph for a specific class, wherein the bars are segmented into strips of classified items, in accordance with aspects of the technology described herein.

Turning now to FIG. 8, a view of the class 3 bidirectional bar graph 526 at a lower level of granularity than shown in FIG. 7 is shown. The lower level of granularity represents different amounts of true positives, false positives, or false negatives as bars. The bars can be selectable and used to view data about the items that form the bar. In one aspect, each bar represents ten items, though aspects of the technology are not limited to this grouping. The amount of items that form a bar can be communicated to and controlled by the user. The user is then able to roughly count the amount of items that fit a certain criteria (e.g., false positives from class 5 with a confidence factor between 0.4 and 0.5).

Information about the items that form the bar can be accessed by selecting the bar in some aspects. For example, selecting the green bar 810, the green bar 812, or the green bar 814 could reveal information about the items that form these true positives. Selecting the single arrow 820 can cause an expansion of the visualization associated with that range of confidence scores. Additional bars will be shown upon selection of the single arrow 820. Using this single arrow indicates the amount of additional bars that might be displayed is within a range smaller than is used with the double and triple arrows. In contrast, the double arrow 822 indicates that a greater amount of bars are available to be displayed. The dark orange hashed bar 826 and the light orange hashed bar 824 indicate false positives. Similarly, the light purple hashed bar 828 represents a group of false positives.

On the left side of the bidirectional bar graph 526, false negatives, or groups of false negatives, are illustrated by colored bars without fill. The perimeter of the bar represents the class into which an item labeled 3 was falsely classified. For example, the light blue bar 830 indicates that a group of items labeled 3 were falsely classified as a 0. As before, the single arrow 823 indicates that additional bars can be accessed by selecting the arrow. The single arrow indicates an amount of bars is less than when a double or triple arrow is used. As before, the different series of bars are associated with different confidence scores. For example, the light green bar 834 comprises items assigned a confidence score of between 0.1 and 0.2.

Figure 9:
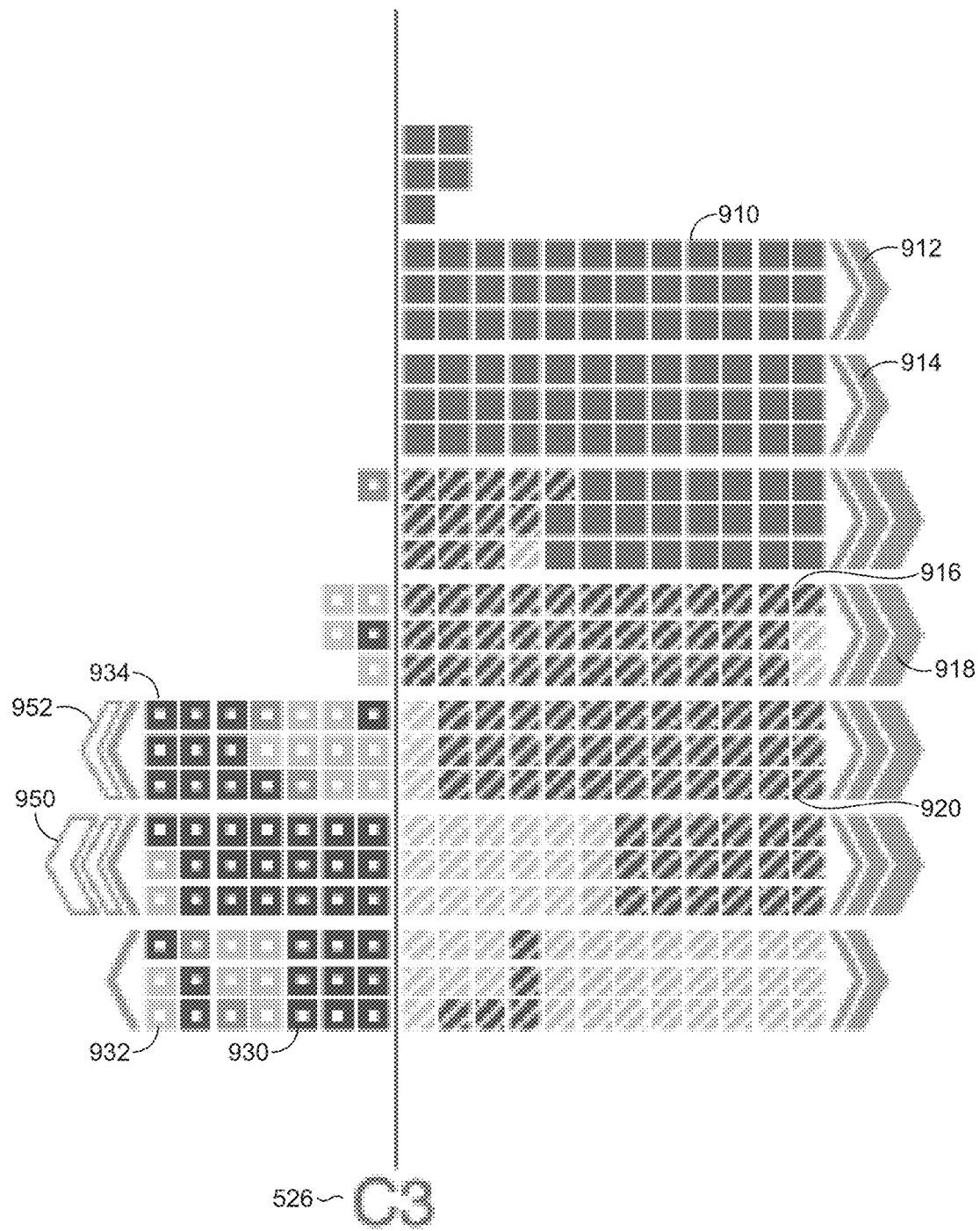
FIG. 9 is an exemplary graphical user interface for providing an interactive visualization of performance for a multi-class classifier showing a bidirectional bar graph for a specific class, wherein the bars are segmented into squares that represent individual items, in accordance with aspects of the technology described herein.

Turning now to FIG. 9, the class 3 bidirectional bar graph 526 is shown at the lowest available level of granularity, which is an item-by-item view. Each classifiable item is represented by a single square. For example, the dark green square 910 represents a true positive for the class 3. The dark red hashed squares 916 and 920 indicate false positives. The double arrows 912 and 914 indicate that an amount of additional items may be accessed by selecting the arrows. Whether a single arrow, double arrow, or triple arrow is used depends on the amount of additional items that have been truncated from the display. Different types of arrows may be associated with different ranges of items. For example, a single arrow may be associated with between 1 and 50, double arrow between 50 and 200, and a triple arrow between 200 and 1,000. These numbers are just used as an example. Selecting the triple arrow 918 will reveal additional individual items that are either true positives or false positives.

As before, the false negatives are shown on the left side. Individual false negatives are shown in the color into which the item was falsely classified. Instead of displaying a square, a outlined square with no fill is shown. For example, the outlined square 934 indicates a false negative for the class 5. The squares 932 and 930 are additional examples of false negatives. The double arrow 952 and the triple arrow 950 indicate that additional amounts of false negatives can be accessed by selecting the arrows.

Figure 10:
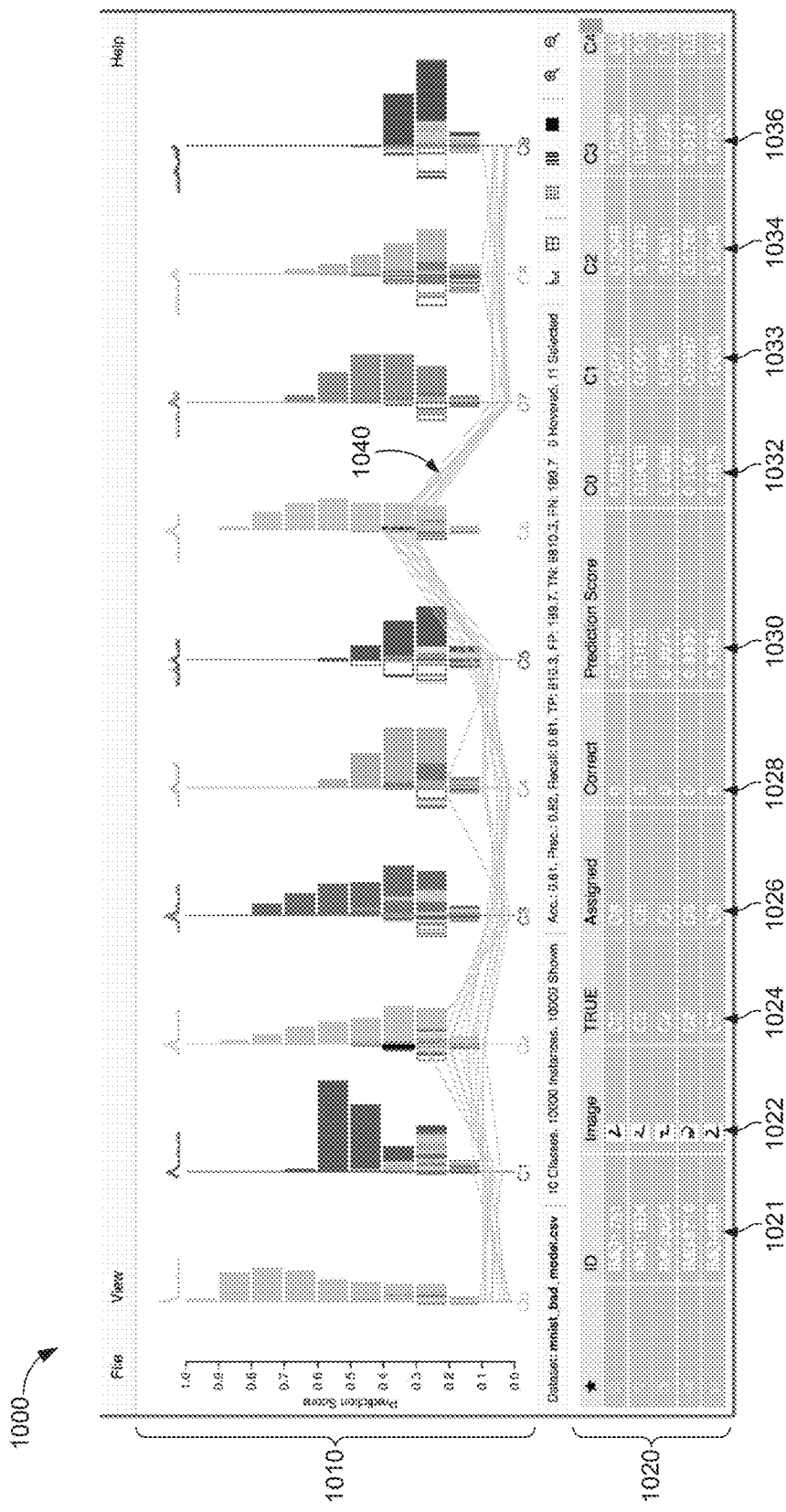
FIG. 10 is an exemplary graphical user interface for providing an interactive visualization of performance for a multi-class classifier showing a bidirectional bar graph for several different classes along with a table showing data for items depicted in the bidirectional bar graph, in accordance with aspects of the technology described herein.

Turning now to FIG. 10, a series of bidirectional bar graph visualizations are illustrated in combination with a table showing the raw data that is used to form the bar graphs. The visualization 1000 includes the series of bidirectional bar graphs 1010 described previously. A portion of the bidirectional bar graph could be selected, such as a square in the class 6 graph where the items were falsely classified as 2s. The selection causes a group of line graphs 1040 to be shown going through these series of items. Each line on the bar graph represents one of the items in the selection. A portion of these items is also shown in the table 1020.

The ID column 1021 shows the test data file that was used to evaluate the performance of the multi-class classifier. In the image column 1022, a thumbnail of the actual image is shown. In the true column 1024, the true label assigned to the image in the test data is shown. In this case, each image is labeled as a class 2. The assigned column 1026 shows the class into which the classifier classified the image. As can be seen, all of these items were classified as a 6. The correct column 1028 indicates whether the classification was correct. In this case, either a 0 or a 1 is used to indicate the correctness. The 0 represents the incorrect classification of the items shown. The prediction or confidence score column 1030 shows the confidence score assigned to the class 6. In other words, the prediction score that was the highest among all of the classes is shown. Prediction scores assigned to other classes are shown to the right. For example, the class 0 column 1032 shows the confidence score that the individual item was a 0. The data shown in the class 1 column 1033, the class 2 column 1034, and the class 3 column 1036 are similar. Notice that the class 2 confidence scores are significantly higher than the scores assigned for the class 0, class 1, or class 3.

Figure 11:
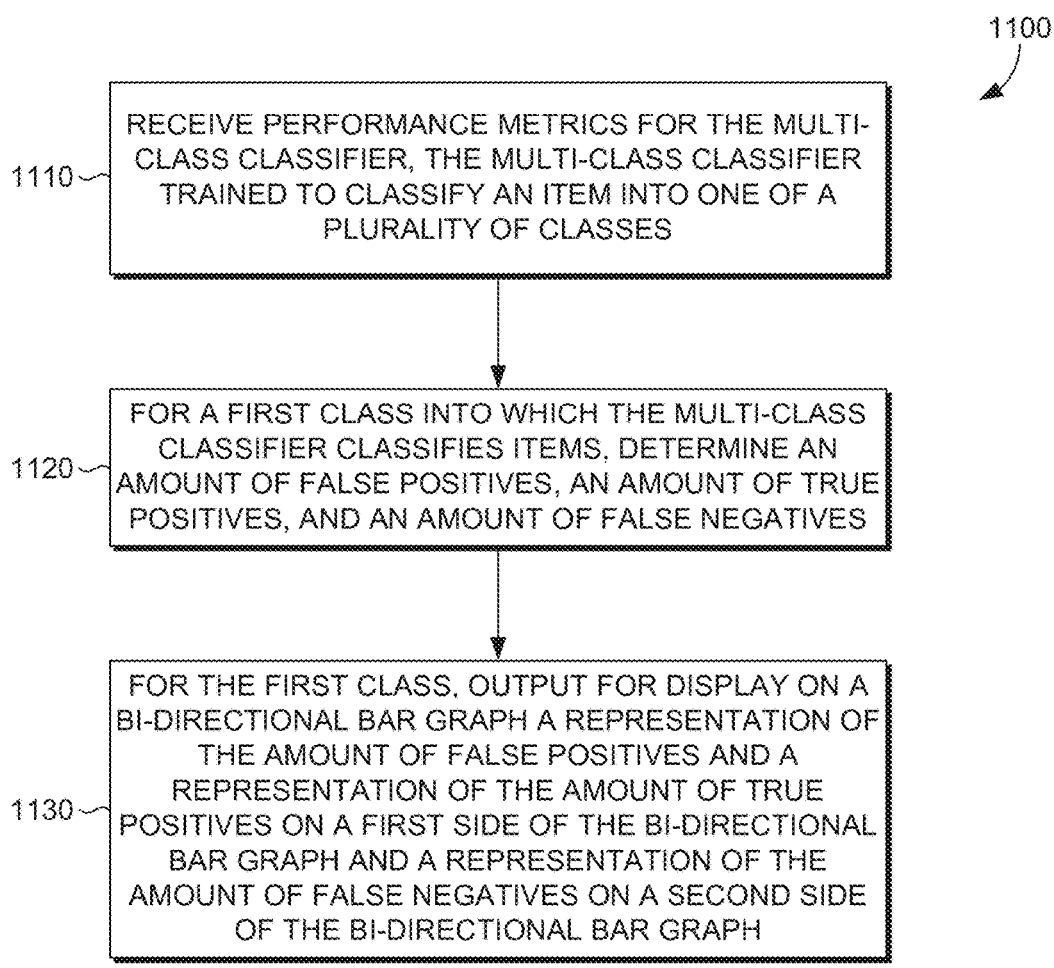
FIG. 11 is a flow diagram that illustrates an exemplary method of displaying performance of a multi-class classifier, in accordance with an aspect of the technology described herein.

Turning now to FIG. 11, a method 1100 of improving a performance of a multi-class classifier is provided. The method 1100 can be performed by a computing device, such as device 100 described previously. A multi-class classifier classifies items into one of more than three different available categories. Method 1100 can be used with any type of multi-class classifier.

At step 1110, performance metrics are received. The performance metrics can be generated for the multi-class classifier by running test data through the multi-class classifier. As described previously, test data comprises a plurality of data items that are classifiable by the multi-class classifier. Different types of classifiers are trained to identify different types of items. For example, a classifier may be trained to identify objects in an image. In this scenario, the test data can comprise a plurality of images with the objects labeled. The test result data can comprise each item of the test data assigned a label by the multi-class classifier. The test result data can also comprise confidence scores generated by the multi-class classifier for each item of test data. A confidence score can be assigned to each available class for each item. The item may ultimately be classified into the class associated with the highest confidence score assigned by the multi-class classifier.

At step 1120, for a first class into which the multi-class classifier classifies items, an amount of false positives is determined, an amount of true positives is determined, and an amount of false negatives is determined. The true positives, false positives, and false negatives can be determined by comparing the label on each item of test data with the classification assigned to the item. Categories of true positives, false positives, and false negatives can be created using other performance data associated with the items in these categories. For example, amounts of true positives associated with a series of different confidence score ranges can be identified. The false positives and false negatives can similarly be grouped by the confidence score ranges.

At step 1130, for the first class, a bidirectional bar graph is output for display. The bar graph comprises a representation of the amount of false positives and a representation of the amount of true positives on a first side of the bidirectional bar graph and a representation of the amount of false negatives on a second side of the bidirectional bar graph. The bidirectional bar graph can be similar to those described previously with reference to FIGS. 3-10.

In one aspect, each class is assigned a color. True positives for that class are displayed in a color associated with the class. False positives are displayed in the color associated with a class into which the classifier classified the object. False negatives can also be displayed in the color of a class into which the classifier classified the object. True positives, false positives, and false negatives can be displayed with visually distinct features. For example, true positives can be depicted as a solid color, false positives can be depicted as a striped shape, and false negatives can be depicted as an empty geometric shape, such as a square or rectangle.

The amount of true positives, false positives, and false negatives can be broken down into categories defined by one or more performance criteria, such as confidence score or correct class. For example, the representation of the amount of false positives associated with a first class could be broken down by both the class into which items should have been classified and a confidence score associated with those misclassified items. For example, a representation could show an amount of items classified into the second class instead of the first class within a confidence score falling into a particular range.

The amount of items in a category can be represented at different levels of granularity. In one aspect, each item of test data can be represented individually with a geometric shape. For example, each item classified as a false positive can be depicted in the representation as a single shape. Accordingly, 100 shapes could be displayed to represent 100 items. In another aspect, a group of items are represented together by a shape. For example, every ten items classified as a true positive could be represented as a single shape. Accordingly, 5 shapes could be presented to represent 50 items. The amount of shapes shown can be based on rounding. For example, if 46 items fit into a category, then five objects representing 10 items each could be shown. Conversely, if 44 items fit into a category, then four objects representing 10 items each could be shown. In another aspect, all of the items with a similar classification can be depicted by a single object with a size that corresponds to the amount. For example, a single bar of a first size could represent 40 items, while a second bar of a larger size could represent 60 items in a category (e.g., true positives). The length of the bars can be proportional to the amount of items depicted.

The bidirectional bar graph can reveal performance deficiencies in the multi-class classifier. For example, confusion between two different classes is readily apparent. A retraining strategy for the multi-class classifier can then be developed to reduce the class confusion.

Figure 12:
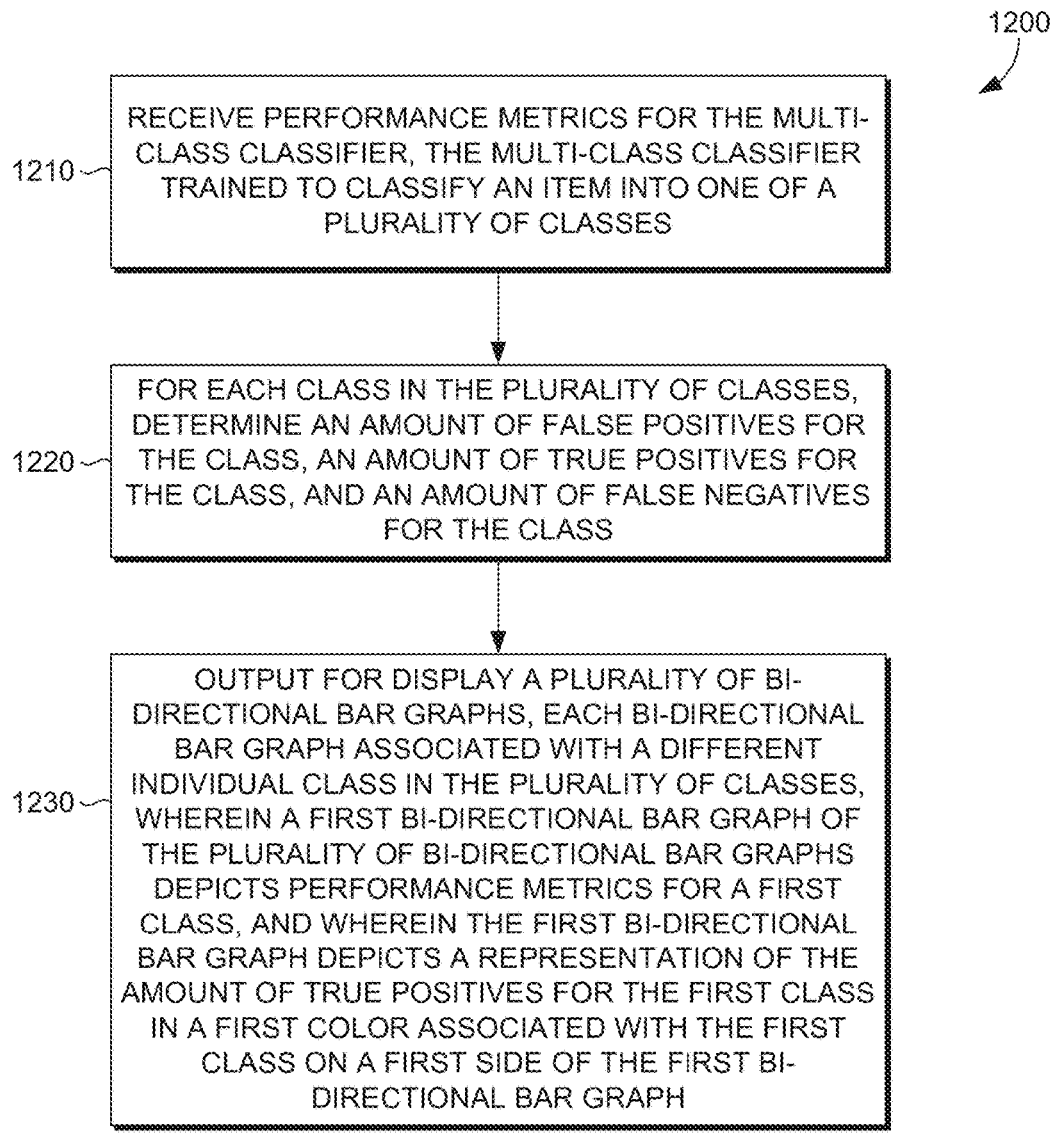
FIG. 12 is a flow diagram that illustrates an exemplary method of displaying performance of a multi-class classifier, in accordance with an aspect of the technology described herein.

Turning now to FIG. 12, a method 1200 of improving the performance of a multi-class classifier is provided. The method 1200 can be performed by a computing device, such as device 100 described previously. A multi-class classifier classifies items into one of more than three different available categories. Method 1200 can be used with any type of multi-class classifier.

At step 1210, performance metrics are received. The performance metrics can be generated for the multi-class classifier by running test data through the multi-class classifier. As described previously, test data comprises a plurality of data items that are classifiable by the multi-class classifier. Different types of classifiers are trained to identify different types of items. For example, a classifier may be trained to identify objects in an image. In this scenario, the test data can comprise a plurality of images with the objects labeled. The test result data can comprise each item of the test data assigned a label by the multi-class classifier. The test result data can also comprise confidence scores generated by the multi-class classifier for each item of test data. A confidence score can be assigned to each available class for each item. The item may ultimately be classified into the class associated with the highest confidence score assigned by the multi-class classifier.

At step 1220, for each class in the plurality of classes, an amount of false positives is determined, an amount of true positives is determined, and an amount of false negatives is determined. The true positives, false positives, and false negatives can be determined by comparing the label on each item of test data with the classification assigned to the item. Categories of true positives, false positives, and false negatives can be created using other performance data associated with the items in these categories. For example, amounts of true positives associated with a series of different confidence score ranges can be identified. The false positives and false negatives can similarly be grouped by the confidence score ranges.

At step 1230, a plurality of bidirectional bar graphs are output for display. Each bidirectional bar graph is associated with a different individual class in the plurality of classes. A first bidirectional bar graph of the plurality of bidirectional bar graphs depicts performance metrics for a first class. The first bidirectional bar graph depicts a representation of the amount of true positives for the first class in a first color associated with the first class on a first side of the first bidirectional bar graph. As described previously, the first bidirectional bar graph can also display false positives on the first side and false negatives on a second side. Conversely, the false negatives could be displayed on the first side and the false positives on the second side. In another aspect, the true positives are displayed on the first side and both the false positives and the false negatives are displayed on the second side. The other bidirectional bar graphs can present similar representations for the performance data associated with other classes. The bidirectional bar graphs can include features described previously, such as with reference to the description of FIGS. 3-10.

The amount of items in a category can be represented at different levels of granularity. In one aspect, each item of test data can be represented individually with a geometric shape. For example, each item classified as a false positive can be depicted in the representation as a single shape. Accordingly, 100 shapes could be displayed to represent 100 items. In another aspect, a group of items are represented together by a shape. For example, every ten items classified as a true positive could be represented as a single shape. Accordingly, 5 shapes could be presented to represent 50 items. The amount of shapes shown can be based on rounding. For example, if 46 items fit into a category, then five objects representing 10 items each could be shown. Conversely, if 44 items fit into a category, then four objects representing 10 items each could be shown. In another aspect, all of the items with a similar classification can be depicted by a single object with a size that corresponds to the amount. For example, a single bar of a first size could represent 40 items, while a second bar of a larger size could represent 60 items in a category (e.g., true positives). The length of the bars can be proportional to the amount of items depicted.

The bidirectional bar graphs can reveal performance deficiencies in the multi-class classifier. For example, confusion between two different classes is readily apparent. A retraining strategy for the multi-class classifier can then be developed to reduce the class confusion.

Figure 13:
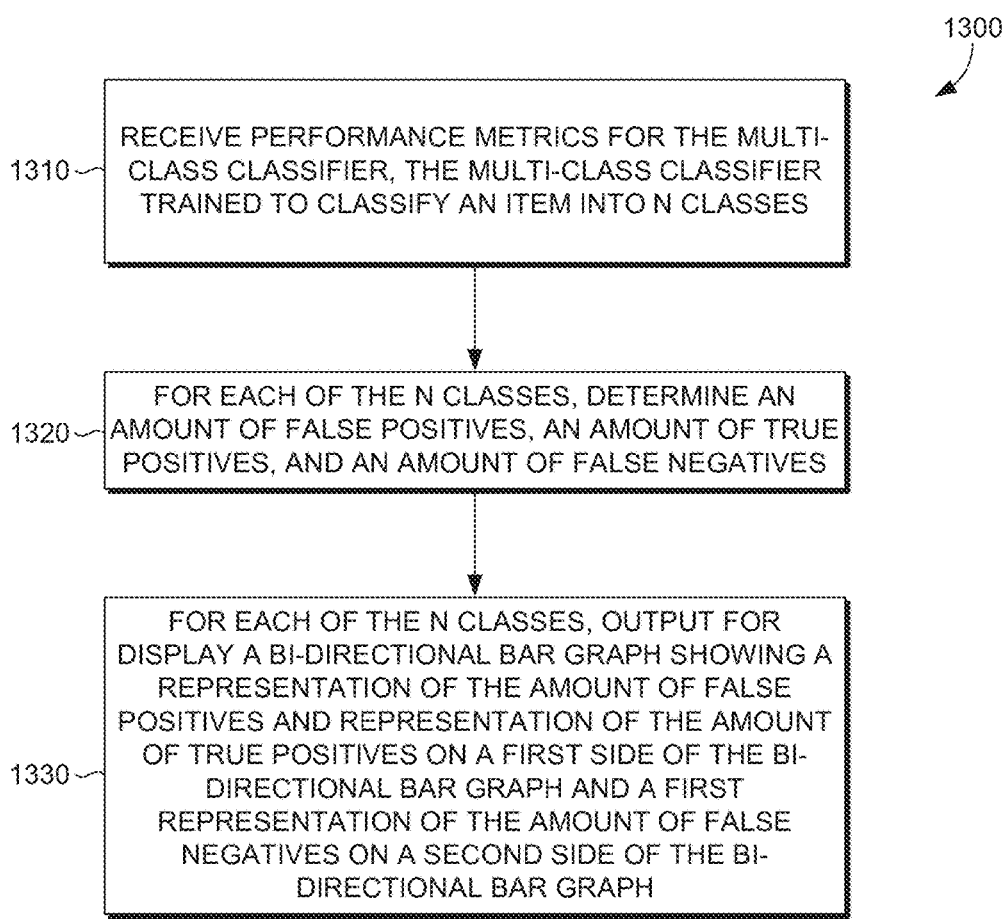
FIG. 13 is a flow diagram that illustrates an exemplary method of displaying performance of a multi-class classifier, in accordance with an aspect of the technology described herein.

Turning now to FIG. 13, a method 1300 of improving a performance of a multi-class classifier is provided. The method 1300 can be performed by a computing device, such as device 100 described previously. A multi-class classifier classifies items into one of more than three different available categories. Method 1300 can be used with any type of multi-class classifier.

At step 1310, performance metrics for the multi-class classifier are received. The performance metrics can be generated by running test data through the multi-class classifier. The multi-class classifier can be trained to classify an item into n classes. N can be an integer greater than 3.

In one aspect, a subset of the classes are selected for inclusion in the performance visualization. This can be useful when the multi-class classifier has a large number of classes. For example, 10 of 40 classes could be included in a single performance visualization. An interface can be provided that allows a user to define the classes that should be depicted in the visualization. The classes can be selected individually or based on a common characteristic. For example, classes related to mammals could be selected as group where the multi-class classifier classifies images as a depicting a type of mammal, a type of machine, and a type landscape. With above 30 classes, or even 10, it is difficult for a meaningful color to be assigned to each class for the purpose of visualizing performance on a per class basis.

As described previously, test data comprises a plurality of data items that are classifiable by the multi-class classifier. Different types of classifiers are trained to identify different types of items. For example, a classifier may be trained to identify objects in an image. In this scenario, the test data can comprise a plurality of images with the objects labeled. The test result data can comprise each item of the test data assigned a label by the multi-class classifier. The test result data can also comprise confidence scores generated by the multi-class classifier for each item of test data. A confidence score can be assigned to each available class for each item. The item may ultimately be classified into the class associated with the highest confidence score assigned by the multi-class classifier.

At step 1320, for each of the n classes, an amount of false positives is determined, an amount of true positives is determined, and an amount of false negatives is determined. The true positives, false positives, and false negatives can be determined by comparing the label on each item of test data with the classification assigned to the item. Categories of true positives, false positives, and false negatives can be created using other performance data associated with the items in these categories. For example, amounts of true positives associated with a series of different confidence score ranges can be identified. The false positives and false negatives can similarly be grouped by the confidence score ranges.

At step 1330, for each of the n classes, a bidirectional bar graph is output for display showing a representation of the amount of false positives and representation of the amount of true positives on a first side of the bidirectional bar graph and a first representation of the amount of false negatives on a second side of the bidirectional bar graph. In one aspect, false positives are also displayed on the first side. In another aspect, the true positives are displayed on the first side and both the false positives and the false negatives are displayed on the second side.

The amount of items in a category can be represented at different levels of granularity. In one aspect, each item of test data can be represented individually with a geometric shape. For example, each item classified as a false positive can be depicted in the representation as a single shape. Accordingly, 100 shapes could be displayed to represent 100 items. In another aspect, a group of items are represented together by a shape. For example, every ten items classified as a true positive could be represented as a single shape. Accordingly, 5 shapes could be presented to represent 50 items. The amount of shapes shown can be based on rounding. For example, if 46 items fit into a category, then five objects representing 10 items each could be shown. Conversely, if 44 items fit into a category, then four objects representing 10 items each could be shown. In another aspect, all of the items with a similar classification can be depicted by a single object with a size that corresponds to the amount. For example, a single bar of a first size could represent 40 items, while a second bar of a larger size could represent 60 items in a category (e.g., true positives). The length of the bars can be proportional to the amount of items depicted.

As mentioned, each class can be assigned a different color. True positives for that class are displayed in a color associated with the class. False positives are displayed in the color associated with a class into which the classifier classified the object. False negatives can also be displayed in the color of a class into which the classifier classified the object. True positives, false positives, and false negatives can be displayed with visually distinct features. For example, true positives can be depicted as a solid color, false positives can be depicted as a striped shape, and false negatives can be depicted as an empty geometric shape, such as a square or rectangle.

The bidirectional bar graphs can reveal performance deficiencies in the multi-class classifier. For example, confusion between two different classes is readily apparent. A retraining strategy for the multi-class classifier can then be developed to reduce the class confusion.

The technology described herein has been described in relation to particular aspects, which are intended in all respects to be illustrative rather than restrictive.

What is claimed is:

1. A computing system comprising:
a processor; and
computer storage memory having computer-executable instructions stored thereon which, when executed by the processor, configure the computing system to improve a performance of a multi-class classifier, the computing system configured to:
receive performance metrics for the multi-class classifier that are generated by running test data through the multi-class classifier, the multi-class classifier trained to classify an item into one of a plurality of classes;
for a first class into which the multi-class classifier classifies items, determine an amount of false positives, an amount of true positives, and an amount of false negatives, wherein a false positive for the first class is an item in the test data that is labeled as a different class that is classified into the first class by the multi-class classifier, wherein a true positive is an item in the test data that is labeled as the first class and is classified into the first class by the multi-class classifier, and wherein a false negative is an item in the test data that is labeled as the first class but is classified into a different class by the multi-class classifier; and
for the first class, output for display on a bidirectional bar graph a representation of the amount of false positives and a representation of the amount of true positives on a first side of the bidirectional bar graph and a representation of the amount of false negatives on a second side of the bidirectional bar graph.

2. The computing system of claim 1, wherein the representation of true positives is displayed in a color associated with the first class.

3. The computing system of claim 2, wherein a portion of the representation of false positives is displayed in a color associated with a second class into which one or more items were classified.

4. The computing system of claim 1, wherein the representation of the amount of true positives comprises multiple bars, wherein an individual bar from the multiple bars depicts an amount of true positive items that were assigned a confidence score within a confidence-score range associated with the individual bar.

5. The computing system of claim 1, wherein the representation of the amount of false positives comprises multiple bars, wherein an individual bar from the multiple bars depicts an amount of false positive items that were assigned a confidence score within a confidence-score range associated with the individual bar.

6. The computing system of claim 1, wherein the representation of the amount of false negatives comprises multiple bars, wherein an individual bar from the multiple bars depicts an amount of false negative items that were assigned a confidence score within a confidence-score range associated with the individual bar.

7. The computing system of claim 1, further configured to output for display above the bidirectional bar graph a spark line showing confidence scores assigned to items labeled into the first class for each available class into which items can be assigned by the multi-class classifier.

8. A computer-implemented method for improving a multi-class classifier, the method comprising:
receiving performance metrics for the multi-class classifier that were generated by running test data through the multi-class classifier, the multi-class classifier trained to classify an item into one of a plurality of classes;
for each class in the plurality of classes, determining an amount of false positives for the class, an amount of true positives for the class, and an amount of false negatives for the class;
outputting for display a plurality of bidirectional bar graphs, each bidirectional bar graph associated with a different individual class in the plurality of classes, wherein a first bidirectional bar graph of the plurality of bidirectional bar graphs depicts performance for a first class, and wherein the first bidirectional bar graph depicts a representation of the amount of true positives for the first class in a first color associated with the first class on a first side of the first bidirectional bar graph, wherein the representation of the amount of true positives comprises a plurality of squares where each square represents an item correctly classified into the first class; and
receiving an interaction with an individual square and outputting for display a line graph that shows a confidence score calculated for each of the classes by the multi-class classifier for the item the individual square represents, and wherein the line graph intersects at least one of the plurality of bidirectional bar graphs.

9. The method of claim 8, wherein the first bidirectional bar graph comprises a representation of an amount of false positives for a second class displayed on the first side of the first bidirectional bar graph in a second color associated with the second class.

10. The method of claim 9, wherein the representation of false positives for the second class is displayed with a stripped pattern.

11. The method of claim 8, wherein the representation of true positives comprises a plurality of stacked bars where each bar represents a group of items correctly classified into the first class.

12. The method of claim 8, wherein the method further comprises concurrently displaying a portion of the performance metrics for items related to a portion of the bidirectional bar graph selected by the user.

13. The method of claim, further configured to output for display above the bidirectional bar graph a spark line showing confidence scores assigned to items labeled into the first class for each available class into which items can be assigned by the multi-class classifier.

14. The method of claim 8, wherein the first bidirectional bar graph depicts a representation of a portion of the amount of false negatives for the first class in a third color associated with a third class on a second side of the first bidirectional bar graph, wherein the portion of false negatives represent an amount of items that are labeled in the first class and classified into the third class by the multi-class classifier.

15. The method of claim 14, wherein the representation of the portion of the amount of false negatives are displayed as a geometric shape with a perimeter drawn in the third color.

16. One or more computer storage media having computer-executable instructions embodied thereon that, when executed by one or more processors, cause the one or more processors to perform a method for improving a multi-class classifier, the method comprising:
generating performance metrics for the multi-class classifier by running test data through the multi-class classifier, the multi-class classifier trained to classify an item into n classes, wherein n is an integer greater than 3;
for each of the n classes, determining an amount of false positives, an amount of true positives, and an amount of false negatives; and for each of the n classes, outputting for display a bidirectional bar graph showing a representation of the amount of false positives and representation of the amount of true positives on a first side of the bidirectional bar graph and a first representation of the amount of false negatives on a second side of the bidirectional bar graph.

17. The media of claim 16, wherein the representation of the amount of false positives comprises a first representation of items assigned a confidence score within a first range and a second representation of items assigned a confidence score within a second range.

18. The media of claim 16, wherein the representation of the amount of false negatives is a colored geometric shape.

19. The media of claim 16, wherein the method further comprises concurrently displaying a portion of the performance metrics for items related to a portion of the bidirectional bar graph selected by the user.

20. The media of claim 19, wherein each of the n classes is assigned a unique color.

* * * * *